United States Patent
Zilbershtein et al.

(10) Patent No.: US 9,229,841 B2
(45) Date of Patent: Jan. 5, 2016

(54) SYSTEMS AND METHODS FOR DETECTING ERRORS AND RECORDING ACTIONS ON A BUS

(71) Applicant: QUALCOMM Incorporated, San Diego, CA (US)

(72) Inventors: Michael Zilbershtein, Haifa (IL); Gilad Sthoeger, Eshchar (IL); Alexander Khazin, Nesher (IL)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 14/202,389

(22) Filed: Mar. 10, 2014

(65) Prior Publication Data

US 2015/0254154 A1    Sep. 10, 2015

(51) Int. Cl.
| | |
|---|---|
| *G06F 11/00* | (2006.01) |
| *G06F 11/34* | (2006.01) |
| *G06F 11/30* | (2006.01) |
| *G06F 11/22* | (2006.01) |

(52) U.S. Cl.
CPC ............ *G06F 11/349* (2013.01); *G06F 11/221* (2013.01); *G06F 11/3027* (2013.01)

(58) Field of Classification Search
CPC .................................................... G06F 11/349
USPC ......................................... 714/43, 44, 45, 56
See application file for complete search history.

(56) References Cited

U.S. PATENT DOCUMENTS

| | | | |
|---|---|---|---|
| 5,408,628 A * | 4/1995 | Ameti | G11C 29/88 714/25 |
| 5,608,755 A * | 3/1997 | Rakib | H04L 25/4921 370/201 |
| 5,812,594 A * | 9/1998 | Rakib | H04L 25/4921 375/219 |
| 6,618,775 B1 | 9/2003 | Davis | |
| 7,493,439 B2 | 2/2009 | Gower et al. | |
| 2002/0059511 A1 | 5/2002 | Sudo et al. | |
| 2011/0208948 A1 | 8/2011 | Knight et al. | |
| 2012/0226837 A1 | 9/2012 | Cruickshank et al. | |
| 2012/0278646 A1 | 11/2012 | Gruber et al. | |
| 2013/0042155 A1 | 2/2013 | Millet et al. | |

OTHER PUBLICATIONS

Author Unknown, "MIPI Alliance Specification for Serial Low-power Inter-chip Media Bus (SLIMbus)," Draft Specification, Version 1.02.00, MIPI Alliance, Inc., Sep. 28, 2012, 221 pages.
International Search Report and Written Opinion for PCT/US2015/019194, mailed Jun. 5, 2015, 10 pages.

* cited by examiner

*Primary Examiner* — Dieu-Minh Le
(74) *Attorney, Agent, or Firm* — Withrow & Terranova, PLLC

(57) ABSTRACT

Systems and methods to detect errors and record actions on a bus are disclosed. In one embodiment, the bus is a serial low-power interchip media bus (SLIMbus) within a computing device. The SLIMbus is coupled to peripherals and a sniffer is positioned within the computing device and coupled to the SLIMbus. The sniffer mimics another SLIMbus peripheral. However, the sniffer uses a pair of multiplexers to know when to record data on the SLIMbus. The data, including the control header and payload of the data signal is captured and logged. The logged data is then exported to memory where it can be further processed so as to help debug communication on the SLIMbus.

20 Claims, 6 Drawing Sheets

SYSTEMS AND METHODS FOR DETECTING ERRORS AND RECORDING ACTIONS ON A BUS

BACKGROUND

I. Field of the Disclosure

The technology of the disclosure relates generally to sniffing and logging data on a bus for error detection.

II. Background

Computing devices use one or more buses to convey data between components within the computing device. In mobile computing devices such as smart phones, one such bus is the serial low power inter-chip media bus (SLIMbus). The SLIMbus was developed with the MIPI® Alliance and supports communication between baseband or application processors and peripheral components. The SLIMbus is particularly well suited for digital audio data streams, although other data may be conveyed over the bus.

The SLIMbus is implemented as a synchronous two-wire, configurable time division multiplexed (TDM) frame structure. The two wires carry the data line and the clock line so as to interconnect multiple components in a multi-drop bus topology. The data line has control and data information. One common use of the SLIMbus is to connect an applications processor to a codec that performs analog to digital or digital to analog conversion. During a design phase of a computing device that incorporates a SLIMbus, the designers may need to debug the communications between the applications processor and the peripheral. Even after the design phase, if a new peripheral is coupled to a SLIMbus within a computing device, there may be issues ensuring that such new devices are able to couple to the SLIMbus correctly which require additional debugging. The primary way to debug in this context is to "sniff" the data on the data line and capture or log the data so that it can be examined for possible sources of error.

Currently, the sniffing and logging is done using an external device that is supplied by an entity that does not make components that use the SLIMbus. One exemplary external SLIMbus sniffer is the SLIMbus Protocol Analyzer, sold by LnK sprl of Belgium (www.lnk-tools.com). Use of such an external device is cumbersome in that leads must be attached to the SLIMbus. Attaching such leads may be difficult in the confined space of the housing of the mobile terminal and/or may require that the bus be removed from the housing of the mobile terminal during testing. Furthermore, currently commercially available sniffing devices are expensive. The expense may mean that a design entity may only have a few such devices which must be shared between multiple design teams trying to perform testing. As yet another inconvenience to the parties doing the testing, the wires used to couple the external device to the SLIMbus have resistive-capacitive loads which may interfere with signal acquisition. As yet another issue with the external testing devices, as bus speeds increase, it is becoming increasingly difficult for the external testing device to capture and record all of the data on the SLIMbus. Thus, there needs to be a more effective system or technique with which to detect errors and record actions on a bus.

SUMMARY OF THE DISCLOSURE

Embodiments disclosed in the detailed description include systems and methods to detect errors and record actions on a bus. In an exemplary embodiment, the bus is a serial low-power interchip media bus (SLIMbus) within a computing device. The SLIMbus is coupled to peripherals, and a sniffer is positioned within the computing device and coupled to the SLIMbus. The sniffer mimics another SLIMbus peripheral. However, the sniffer uses a pair of multiplexers to know when to record data on the SLIMbus. The data, including the control header and payload of the data signal is captured and logged. The logged data is then exported to memory where it can be further processed so as to help debug communication on the SLIMbus.

By integrating the sniffer into the computing device, the need for an expensive external testing device is eliminated. The integrated sniffer allows initial design to be expedited since design teams no longer have to wait for a shared testing device to become available. Further, updates that involve a new peripheral being added to a SLIMbus may be simplified since the integrated sniffer allows for debugging instead of having to work with an external testing device.

In this regard in one embodiment, a computing system is disclosed. The computing system comprises a SLIMbus carrying a clock signal and a time divided data signal, the time divided data signal having signals, each signal comprising a control header and data space. The computing system also comprises a first peripheral communicatively coupled to the SLIMbus and configured to send signals on the SLIMBUS and a second peripheral communicatively coupled to the SLIMbus and configured to receiver signals on the SLIMbus. The computing system also comprises a sniffer comprising a pair of multiplexers (MUX) configured to receive a port logger enable signal from a control system. The sniffer is communicatively coupled to the SLIMbus as a peripheral but internal to the computing system and is configured to capture the signals by capturing each time slot of the time divided data signal including each control header and each date space. The sniffer is also configured to log the signals and export the signals to memory associated with the computing system.

In another embodiment, a sniffer is disclosed. The sniffer is communicatively coupled to a SLIMbus carrying a clock signal and a time divided data signal, the time divided data signal having signals, each signal comprising a control header and data space. The sniffer comprises a pair of MUX configured to receive a port log enable signal from a control system. The sniffer operates as a peripheral on the SLIMbus and is positioned within a housing that contains the SLIMbus. The sniffer is configured to capture signals on the SLIMbus by capturing each time slot of the time divided data signal including each control header and each data space. The sniffer is also configured to log the signals and export the signals to memory.

In another embodiment, a method is disclosed. The method comprises coupling a SLIMbus to a first peripheral. The method also comprises coupling the SLIMbus to a second peripheral. The method also comprises coupling a sniffer comprising a pair of MUX to the SLIMbus as a peripheral such that the sniffer is within a computing device containing the SLIMbus. The method also comprises conveying signals having a clock signal and a time divided data signal between the first peripheral and the second peripheral over the SLIMbus. The method also comprises receiving a port logger enable signal at a least one of the pair of MUX from a control signal; capturing the signals with the sniffer by capturing each time slot of the time divided data signal including each control header and each data space; logging the signals with sniffer and exporting the signals from the sniffer to memory associated with the computing device.

DETAILED DESCRIPTION

Figure 1:
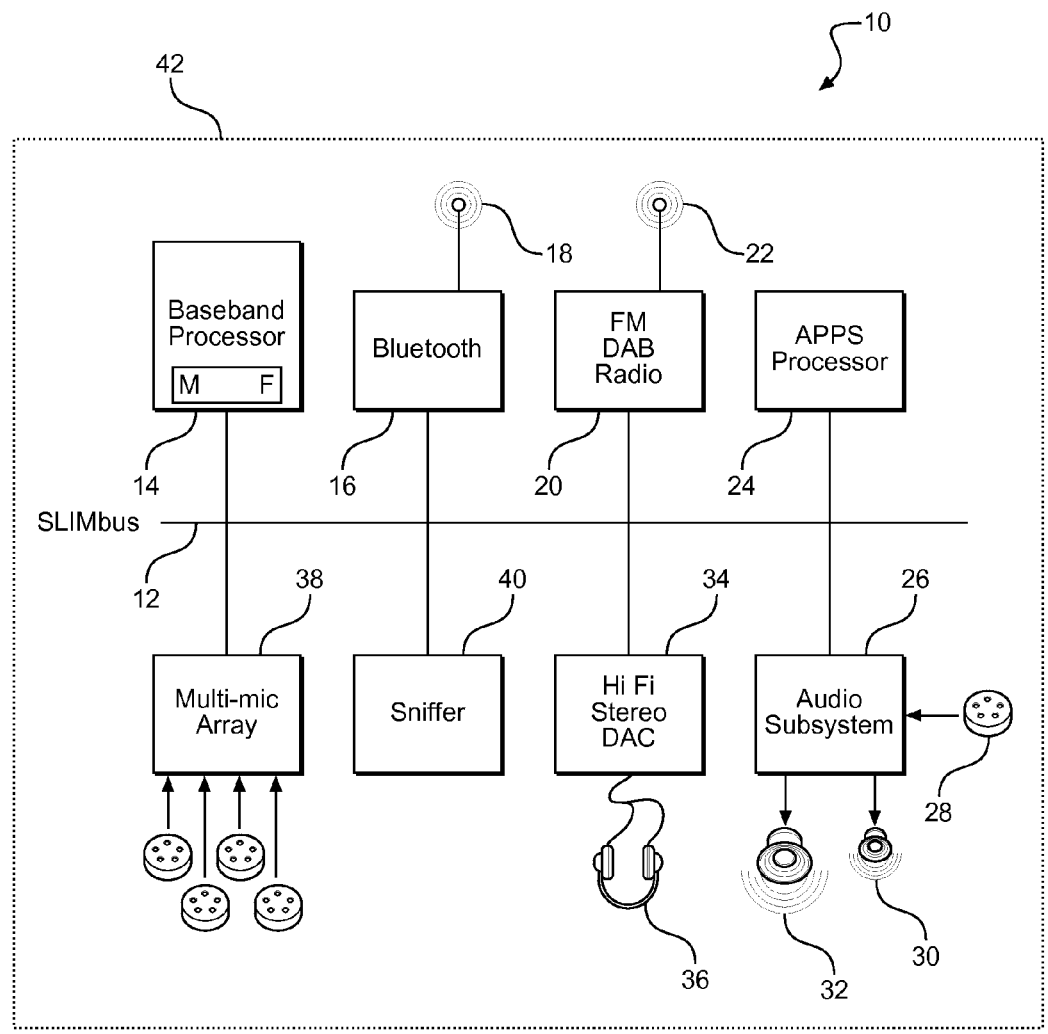
FIG. 1 is a block diagram of an exemplary computing device having a serial low-power interchip media bus (SLIMbus) and a plurality of peripherals including a sniffer according to an exemplary embodiment of the present disclosure.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include systems and methods to detect errors and record actions on a bus. In an exemplary embodiment, the bus is a serial low-power interchip media bus (SLIMbus) within a computing device. The SLIMbus is coupled to peripherals and a sniffer is positioned within the computing device and coupled to the SLIMbus. The sniffer mimics another SLIMbus peripheral. However, the sniffer uses a pair of multiplexers (MUX) to know when to record data on the SLIMbus. The data, including the control header and payload of the data signal is captured and logged. The logged data is then exported to memory where it can be further processed so as to help debug communication on the SLIMbus.

By integrating the sniffer into the computing device, the need for an expensive external testing device is eliminated. The integrated sniffer allows initial design to be expedited since design teams no longer have to wait for a shared testing device to become available. Further, updates that involve a new peripheral being added to a SLIMbus may be simplified since the integrated sniffer allows for debugging instead of having to work with an external testing device.

In this regard, FIG. 1 is a simplified computing device 10 that includes a SLIMbus 12 having a baseband processor 14 and other peripherals coupled thereto. In particular, the peripherals may include a Bluetooth module 16 with associated antenna 18, a frequency modulated (FM) Digital Audio Broadcast (DAB) radio 20 with associated antenna 22, an applications (APPS) processor 24, an audio subsystem 26 with associated microphone 28, ear piece 30 and ringer 32, a high fidelity (Hi Fi) stereo digital to audio converter (DAC) 34 with associated headphones 36, a multi-microphone array 38, and a sniffer 40. The SLIMbus 12, baseband processor 14, and peripherals, including the sniffer 40 are contained within the housing 42 of the computing device 10.

With continued regard to FIG. 1, the majority of the peripherals are conventional and well understood and no further explanation is provided. However, the sniffer 40 represents an exemplary embodiment of the systems and methods to detect errors and record actions on a bus and more detail is provided about sniffer 40 below with reference to FIGS. 6 and 7. However, before discussing the details of the sniffer 40, a brief overview of the details of the SLIMbus 12 are provided with reference to FIGS. 2-5 so that the operation of the sniffer 40 is better understood.

Figure 2:
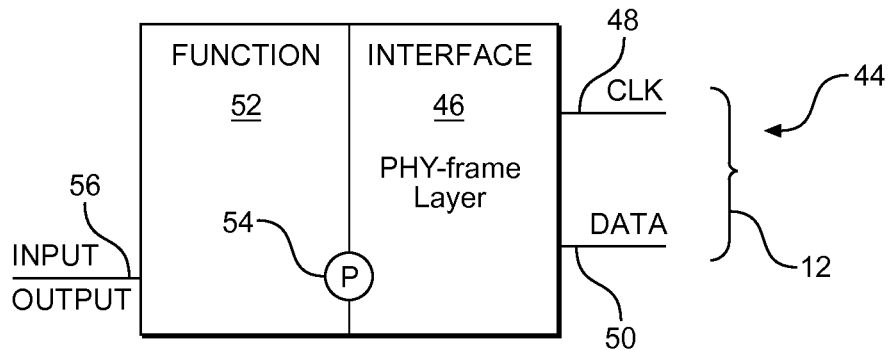
FIG. 2 is a block diagram of a simple SLIMbus component that may be attached to the SLIMbus.

In this regard, FIG. 2 illustrates a simple SLIMbus component 44 that has two SLIMbus devices, namely a SLIMbus interface 46 configured to receive a clock signal line 48 and a data signal line 50 of the SLIMbus 12, and a function device 52 with a port (P) 54 providing the connection path for data flow between the devices (i.e. interface 46 and function device 52). The interface 46 provides bus management services, monitors the physical (PHY) layer for errors, reports information about the status of the simple SLIMbus component 44, and generally implements the message and transport protocols. The function device 52 may be a DAC, analog to digital converter (ADC), digital amplifier, or the like and may have an input or output 56.

Figure 3:
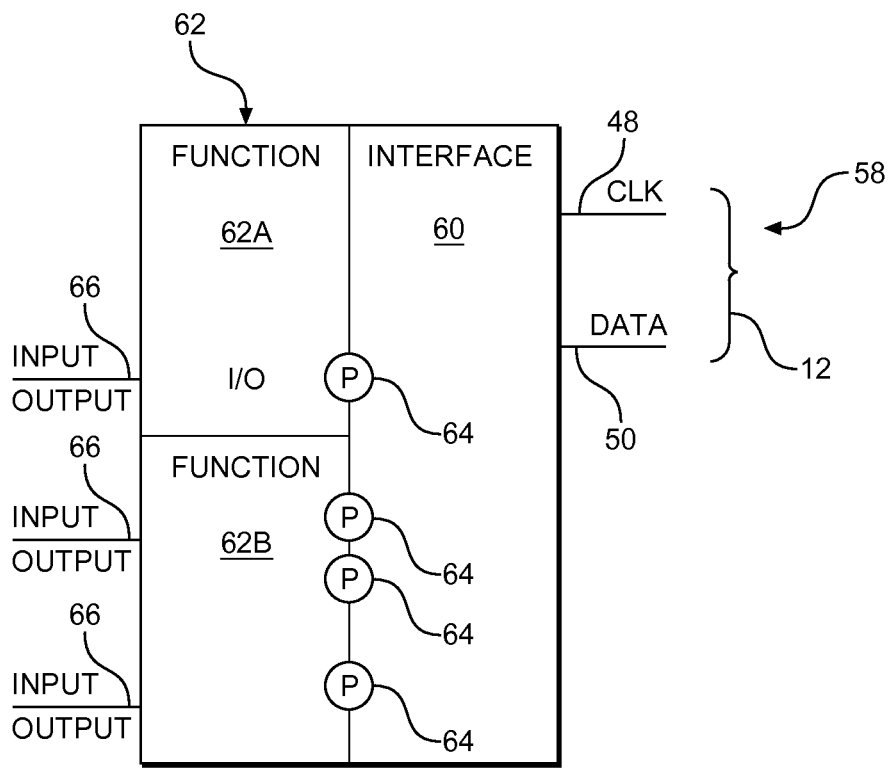
FIG. 3 is a block diagram of a complex SLIMbus component that may be attached to the SLIMbus.
Figure 4:
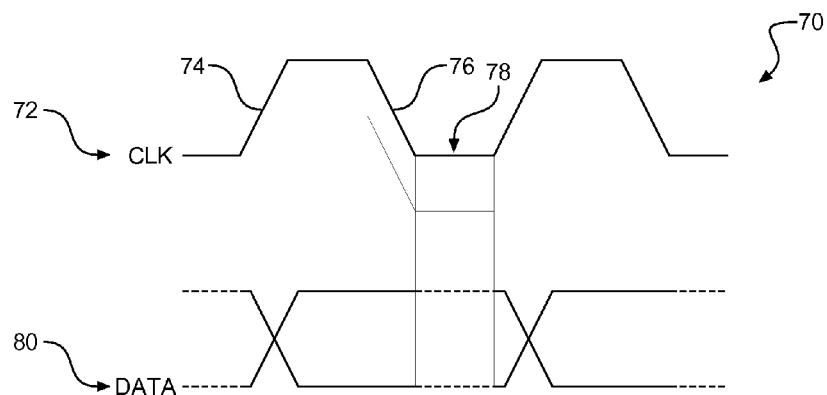
FIG. 4 illustrates a simplified cell structure relative to the clock for a SLIMbus such as the SLIMbus of FIG. 1.

While FIG. 2 illustrates a simple SLIMbus component 44, FIG. 3 illustrates an exemplary complex SLIMbus component 58. The complex SLIMbus component 58 includes an interface 60 substantially similar to the interface 46 of the simple SLIMbus component 44. However, the complex SLIMbus component 58 has two or more function devices 62 (two function devices 62A, 62B illustrated) with a corresponding increase in the number of ports 64 that provide the connection path for data flow from the function devices 62 to the interface 60. The function devices 62 may have corresponding input and outputs 66.

As is intimated by FIGS. 2 and 3, the SLIMbus 12 has two conductive lines, namely the clock signal line 48 and the data signal line 50. For almost all SLIMbus components (44, 58), the clock signal line 48 operates to receive the clock signal and not send a clock signal. If the SLIMbus component 44, 58 has a framer device, that component has a bi-directional clock signal. The data signal is driven on the positive edge and read on the negative edge of the clock signal. This concept is illustrated by the cell 70 illustrated in FIG. 4. In particular, the clock signal 72 has a rising or positive edge 74 and a falling or negative edge 76 with a low 78 between clock pulses. The data signal 80 writes during positive edge 74 and reads on the negative edge 76. The output driver of the component is disabled while the clock signal 72 is at low 78 (generally indicated at 82). The data signal 80 is generally divided into cells 70 (defined as a region of the data signal 80 bounded by two consecutive positive edges 74), slots, frames, subframes, and superframes.

Figure 5:
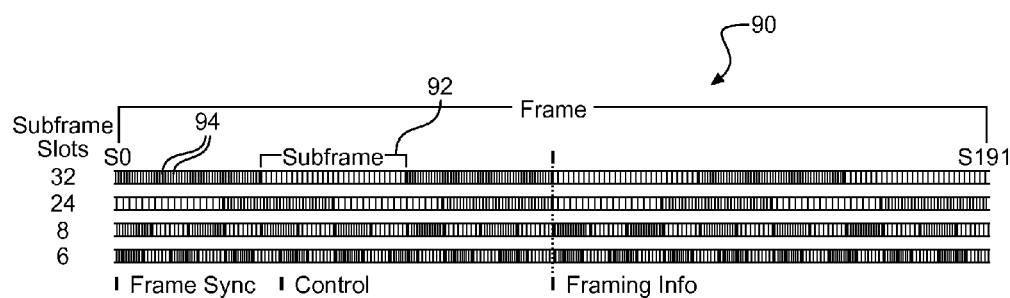
FIG. 5 illustrates a diagram of frame and subframe divisions within the data signal on the SLIMbus.

An exemplary frame 90 is illustrated in FIG. 5 with subframe 92 and slots 94 illustrated within frame 90. Within each slot 94, there are four cells 70. A frame 90 is one hundred ninety-two (192) slots 94. The first slot 94 of each frame 90 is a control space slot which contains the four (4) bit Frame Sync symbol. Slot S96 of each frame 90 is also a control space slot which contains four (4) bits of framing information. Any slots not devoted to control space are considered data space. As noted above, the SLIMbus 12 uses a time division multiplexing format to slice the frames 90 for delivery to different ones of the peripherals.

The sniffer 40 of the present disclosure is designed to capture not just the data in the data space, but also the data in the control space slots. Further, the sniffer 40 captures all the frames 90, not just the ones that are addressed to sniffer 40. By capturing all the data in all the frames 90, the data is then available to be analyzed and errors in the control space slots or formatting within the data space may be detected and debugged.

Figure 6:
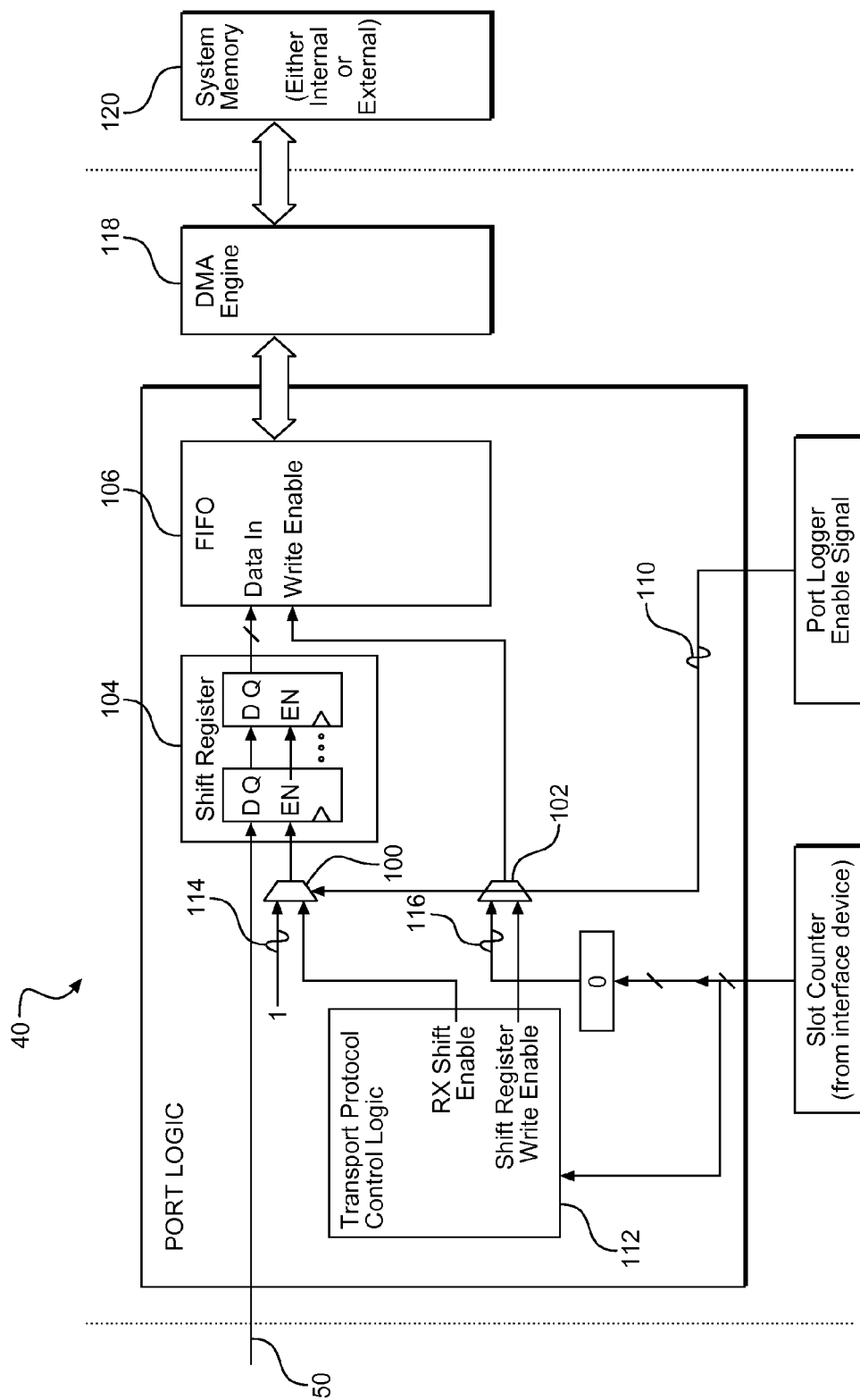
FIG. 6 is a block diagram of the sniffer used to facilitate debugging on the SLIMbus according to an exemplary embodiment of the present disclosure.

In this regard, sniffer 40 is illustrated in FIG. 6. Sniffer 40 is coupled to the SLIMbus 12 as if it were a normal peripheral. However, the sniffer 40 captures all the data on the data signal line 50 as further explained below. In particular, the sniffer 40 includes two MUX 100, 102. The first MUX 100 provides an output to an input register 104, and particularly enables the elements within the input register 104. The input register 104 receives the data on the data signal line 50 at the data input and provides an output to a first in first out (FIFO) buffer 106. The second MUX 102 provides a write enable signal to the FIFO buffer 106 allowing data from the input register 104 to be written to the FIFO buffer 106.

With continued reference to FIG. 6, a slot counter 108 from the interface device of the sniffer 40 provides an input to a transport protocol control logic 112 and the second MUX 102. A control system (not illustrated) generates a port logger enable signal 110 that is provided to the first MUX 100 and the second MUX 102. The first MUX receives a logical one through signal 114 and a receive shift enable signal from the transport protocol control logic 112. Similarly, the second MUX 102 receives a logical zero through signal 116 and a shift register write enable signal from the transport protocol control logic 112. Thus, based on the slot counter 108 the transport protocol control logic 112 selectively enables the MUX 100, 102, which in turn causes the data at the input register 104 to be received and written in the FIFO buffer 106. In an exemplary embodiment, the sniffer is configured to capture the data at each negative clock edge 76 of the clock signal 72.

With continued reference to FIG. 6, the FIFO buffer 106 exports the data to a direct memory access (DMA) engine 118, which in turn passes the data to the system memory 120 for further analysis and debugging. While referred to as a DMA engine 118, it should be appreciated that the DMA engine 118 is a form of bidirectional associative memory (BAM). The system memory 120 may be internal to the computing device 10 or external as needed or desired. The data may be passed from the FIFO buffer 106 through an advanced microcontroller bus architecture (AMBA) high performance bus (AHB) write process. The control system may access the system memory 120 to evaluate and debug the data.

Figure 7:
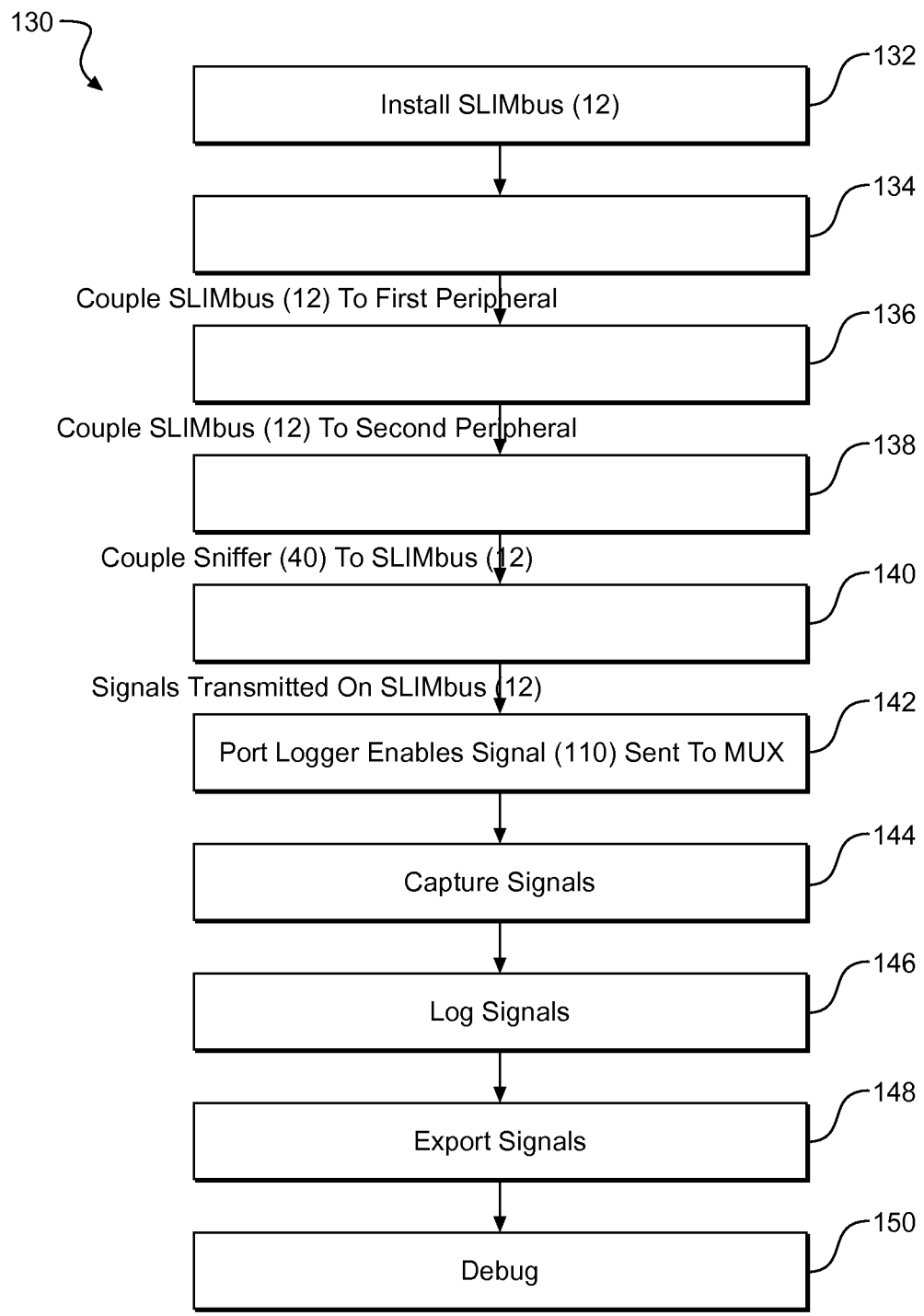
FIG. 7 is a flowchart illustrating an exemplary process for sniffing, logging, and debugging with the sniffer of FIG. 6.

FIG. 7 provides a flow chart of the process 130 through which the sniffer 40 captures data on the SLIMbus 12 to facilitate the debugging. In particular, the SLIMbus 12 is installed in the computing device 10 (block 132). The SLIMbus 12 is coupled to a first peripheral (block 134) and a second peripheral (block 136) such that communication may take place between the first peripheral and the second peripheral. The sniffer 40 is coupled to the SLIMbus 12 (block 138). Note that the precise order in which elements are coupled to the SLIMbus 12 is not central to the present disclosure. Signals are transmitted between peripherals on the SLIMbus 12 (block 140). The port logger enable signal 110 is sent to the MUX 100, 102 (block 142). The sniffer 40 then captures the data signals (block 144) by sampling the data on the negative edge of the clock signal. The captured signals are then logged (block 146) and exported to the system memory 120 (block 148). A control system may then use the data in the system memory 120 to perform debugging operations.

Figure 8:
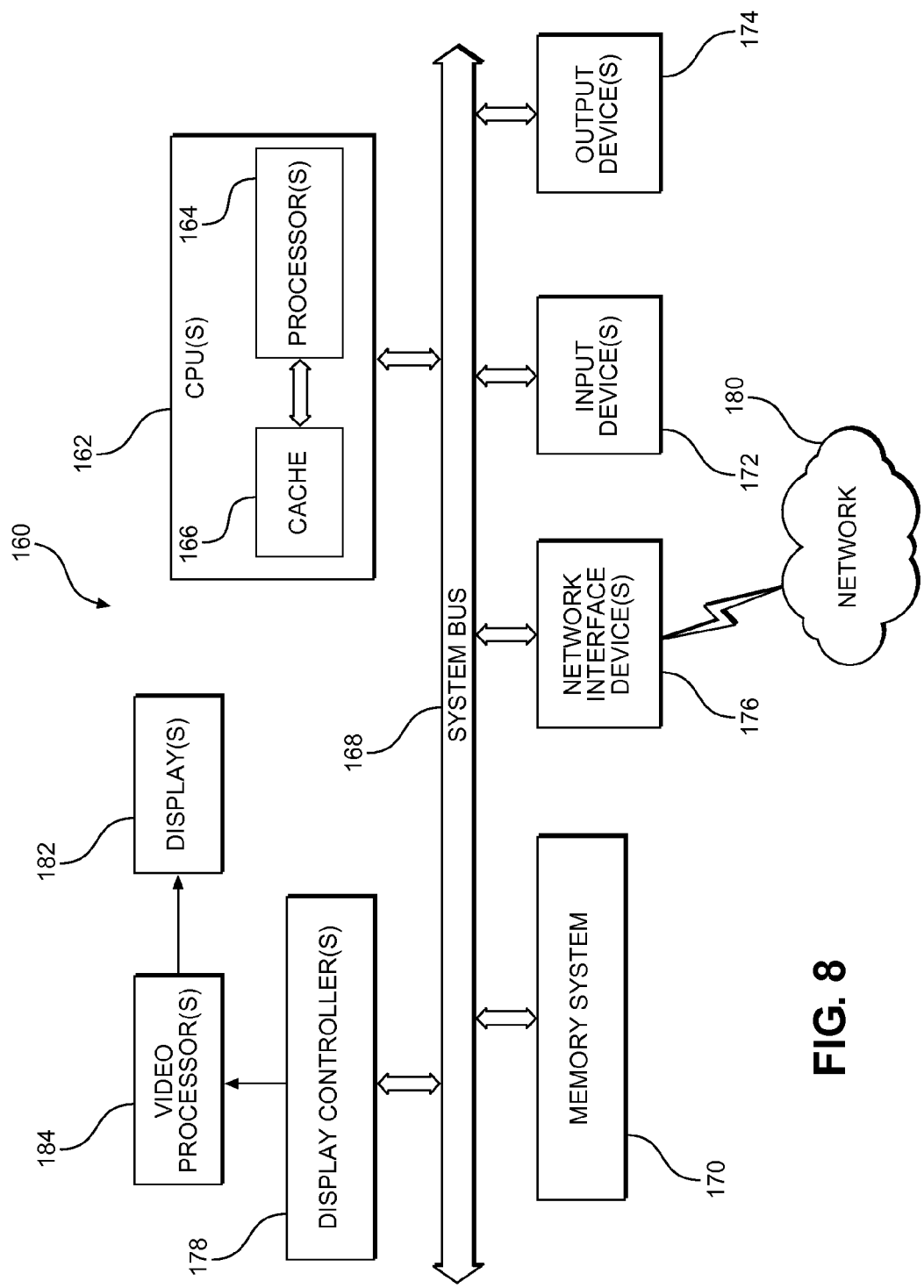
FIG. 8 is a block diagram of an exemplary processor-based system that can include a SLIMbus and associated peripherals such as illustrated in FIG. 1, including the sniffer of FIG. 6.

As alluded to above, the SLIMbus 12 with its peripherals may be in a computing device 10. Such a computing device 10 is further explored with reference to FIG. 8. In this regard, FIG. 8 illustrates an example of a processor-based system 160 (i.e., computing device 10) that can employ the sniffer 40 illustrated in FIG. 6. In this example, the processor-based system 160 includes one or more central processing units (CPUs) 162, each including one or more processors 164. As used herein the CPUs 162 may be the control system that generates the port logger enable signal 110 (FIG. 6). The CPU(s) 162 may have cache memory 166 coupled to the processor(s) 164 for rapid access to temporarily stored data. The CPU(s) 162 is coupled to a system bus 168 and can intercouple devices included in the processor-based system 160. As is well known, the CPU(s) 162 communicates with these other devices by exchanging address, control, and data information over the system bus 168. Note that the system bus 168 is different from the SLIMbus 12.

Other devices can be connected to the system bus 168. As illustrated in FIG. 8, these devices can include a memory system 170, one or more input devices 172, one or more output devices 174, one or more network interface devices 176, and one or more display controllers 178, as examples. The input device(s) 172 can include any type of input device, including but not limited to input keys, switches, voice processors, etc. The output device(s) 174 can include any type of output device, including but not limited to audio, video, other visual indicators, etc. The network interface device(s) 176 can be any devices configured to allow exchange of data to and from a network 180. The network 180 can be any type of network, including but not limited to a wired or wireless network, private or public network, a local area network (LAN), a wide local area network (WLAN), and the Internet. The network interface device(s) 176 can be configured to support any type of communication protocol desired.

The CPU(s) 162 may also be configured to access the display controller(s) 178 over the system bus 168 to control information sent to one or more displays 182. The display controller(s) 178 sends information to the display(s) 182 to be displayed via one or more video processors 184, which process the information to be displayed into a format suitable for the display(s) 182. The display(s) 182 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A computing system comprising:
   a serial low-power interchip media bus (SLIMbus) carrying a clock signal and a time divided data signal, the time divided data signal having signals, each signal comprising a control header and data space;
   a first peripheral communicatively coupled to the SLIMbus and configured to send signals on the SLIMbus;
   a second peripheral communicatively coupled to the SLIMbus and configured to receive signals on the SLIMbus; and
   a sniffer comprising a pair of multiplexers (MUX) configured to receive a port logger enable signal from a control system, the sniffer communicatively coupled to the SLIMbus as a peripheral but internal to the computing system and configured to:
      capture the signals by capturing each time slot of the time divided data signal including each control header and each data space;
      log the signals; and
      export the signals to memory associated with the computing system.

2. The computing system of claim 1, wherein the sniffer is configured to capture the signals by, at each negative clock edge of the clock signal, sampling the time divided data signal.

3. The computing system of claim 1, wherein the sniffer is configured to export the signals to memory through an advanced microcontroller bus architecture (AMBA) high-performance bus (AHB) write process.

4. The computing system of claim 1, wherein a first of the pair of MUX is configured to receive a receive shift enable signal from a transport protocol control logic and a logical one.

5. The computing system of claim 4, wherein a second of the pair of MUX is configured to receive a shift register write enable signal and a logical zero from a slot counter.

6. The computing system of claim 1, further comprising a bidirectional associative memory (BAM) module communicatively coupled to the sniffer, wherein the sniffer stores data and control bits using the BAM module.

7. The computing system of claim 1, further comprising the control system that sends the port logger enable signal.

8. The computing system of claim 7, wherein the control system is further configured to analyze the signals exported to memory to debug activity on the SLIMbus.

9. The computing system of claim 7, wherein the control system is configured to export the signals to an external device so that the signals may be analyzed to debug activity on the SLIMbus.

10. A sniffer communicatively coupled to a serial low-power interchip media bus (SLIMbus) carrying a clock signal and a time divided data signal, the time divided data signal having signals, each signal comprising a control header and data space,
   the sniffer comprising a pair of multiplexers (MUX) configured to receive a port log enable signal from a control system;
   the sniffer operating as a peripheral on the SLIMbus and positioned within a housing that contains the SLIMbus; and
   the sniffer configured to:
      capture signals on the SLIMbus by capturing each time slot of the time divided data signal including each control header and each data space;
      log the signals; and
      export the signals to memory.

11. A method comprising:
   coupling a serial low-power interchip media bus (SLIMbus) to a first peripheral;
   coupling the SLIMbus to a second peripheral;
   coupling a sniffer comprising a pair of multiplexers (MUX) to the SLIMbus as a peripheral such that the sniffer is within a computing device containing the SLIMbus;
   conveying signals having a clock signal and a time divided data signal between the first peripheral and the second peripheral over the SLIMbus;
   receiving a port logger enable signal at at least one of the pair of MUX from a control signal;
   capturing the signals with the sniffer by capturing each time slot of the time divided data signal including each control header and each data space;

logging the signals with the sniffer; and exporting the signals from the sniffer to memory associated with the computing device.

12. The method of claim 11, wherein capturing the signals comprises sampling the time divided data signal at each negative clock edge of the clock signal.

13. The method of claim 11, wherein exporting the signals comprises exporting the signals through an advanced microcontroller bus architecture (AMBA) high performance bus (AHB) write process.

14. The method of claim 11, further comprising, receiving, at a first of the pair of MUX, a receive shift enable signal from a transport protocol control logic and a logical one.

15. The method of claim 14, further comprising, receiving, at a second of the pair of MUX, a shift register write enable and a logical zero from a slot counter.

16. The method of claim 11, further comprising storing data and control bits in a bidirectional associative memory (BAM) module.

17. The method of claim 11, further comprising sending the port logger enable signal from a control system.

18. The method of claim 17, further comprising analyzing the signals exported to memory to debug activity on the SLIMbus.

19. The method of claim 18, wherein analyzing the signals comprises exporting the signals to an external device so that the signals may be analyzed to debug activity on the SLIMbus.

20. The method of claim 18, wherein analyzing the signals comprises analyzing the signals at a local control system.

* * * * *